United States Patent
Herrmann et al.

(10) Patent No.: US 9,719,608 B2
(45) Date of Patent: Aug. 1, 2017

(54) ACTUATOR FOR VALVES IN INTERNAL COMBUSTION ENGINES

(71) Applicant: PIERBURG GMBH, Neuss (DE)

(72) Inventors: Berthold Herrmann, Neuss (DE); Bjoern Jonas Ozdyk, Dusseldorf (DE); Holger Paffrath, Pulheim (DE); Halim Celik, Hureth (DE)

(73) Assignee: PIERBURG GMBH, Neuss (DE)

( * ) Notice: Subject to any disclaimer, the term of this patent is extended or adjusted under 35 U.S.C. 154(b) by 0 days.

(21) Appl. No.: 15/030,870

(22) PCT Filed: Sep. 19, 2014

(86) PCT No.: PCT/EP2014/070009
§ 371 (c)(1),
(2) Date: Apr. 21, 2016

(87) PCT Pub. No.: WO2015/058915
PCT Pub. Date: Apr. 30, 2015

(65) Prior Publication Data
US 2016/0252188 A1      Sep. 1, 2016

(30) Foreign Application Priority Data
Oct. 24, 2013   (DE) .......................... 10 2013 111 724

(51) Int. Cl.
| F16K 31/06 | (2006.01) |
| F01N 3/22  | (2006.01) |
| F02M 26/53 | (2016.01) |
| F16K 27/02 | (2006.01) |

(52) U.S. Cl.
CPC .......... *F16K 31/0658* (2013.01); *F01N 3/222* (2013.01); *F02M 26/53* (2016.02); *F16K 27/029* (2013.01); *F01N 2390/02* (2013.01)

(58) Field of Classification Search
CPC ... F16K 31/0658; F16K 27/029; F02M 26/53; F01N 3/222; F01N 2390/02
USPC ........................................ 251/129.15, 129.01
See application file for complete search history.

(56) References Cited

U.S. PATENT DOCUMENTS

| 5,878,704 A * | 3/1999 | Schebitz ................... F01L 9/04 123/90.11 |
| 6,076,550 A | 6/2000 | Hiraishi et al. |
| 6,178,956 B1 | 1/2001 | Steinmann et al. |
| 6,659,421 B1 * | 12/2003 | Goossens ................ B60T 8/363 251/129.02 |
| 2012/0223264 A1 * | 9/2012 | Doerr et al. ........ F16K 31/0682 251/129.15 |

(Continued)

FOREIGN PATENT DOCUMENTS

| DE | 10 2007 036 924 A1 | 2/2009 |
| DE | 10 2008 050 252 A1 | 4/2010 |
| EP | 2 597 294 A2 | 5/2013 |

*Primary Examiner* — John Bastianelli
(74) *Attorney, Agent, or Firm* — Norman B. Thot

(57) ABSTRACT

An actuator for a valve in an internal combustion engine includes an actuator housing, an electromagnet arranged in the actuator housing, the electromagnet comprising a yoke plate arranged at an axial end of the actuator housing, at least one clamping plate, and a sealing ring arranged at an axial side of the yoke plate facing the electromagnet. The sealing ring is pressed axially towards the yoke plate via the at least one clamping plate.

12 Claims, 2 Drawing Sheets

(56) References Cited

U.S. PATENT DOCUMENTS

2013/0167815 A1\* 7/2013 Bareis ................ F02M 25/0773
   123/568.24
2013/0306895 A1\* 11/2013 Arikawa ............. F16K 31/0658
   251/129.15

\* cited by examiner

ACTUATOR FOR VALVES IN INTERNAL COMBUSTION ENGINES

CROSS REFERENCE TO PRIOR APPLICATIONS

This application is a U.S. National Phase application under 35 U.S.C. §371 of International Application No. PCT/EP2014/070009, filed on Sep. 19, 2014 and which claims benefit to German Patent Application No. 10 2013 111 724.4, filed on Oct. 24, 2013. The International Application was published in German on Apr. 30, 2015 as WO 2015/058915 A1 under PCT Article 21(2).

FIELD

The present invention relates to an actuator for valves in internal combustion engines having an electromagnet, an actuator housing in which the electromagnet is arranged, and a yoke plate of the electromagnet which is arranged at an axial end of the actuator housing.

BACKGROUND

Such electromagnetic actuators serve to operate valves, such as exhaust gas return valves to control the amount of exhaust gas returned to the combustion chamber, or secondary air valves to control the amount of secondary air introduced into the exhaust gas piping, which are used to reduce pollutants in internal combustion engines.

The actuator housing in these valves is usually axially fastened by screws to the flow housing via a flanged connection with a sealing being interposed. In the electromagnetic valves, a yoke plate frequently defines the axial termination of the actuator so that the actuator is delimited at its side facing the flow housing by the yoke plate in the interior of which the core of the electromagnetic circuit is arranged. The yoke plate accordingly serves as a flange of the actuator, while the actuator housing radially surrounding the electromagnet is injection-molded around the coil, wherein the yoke plate serves as an axial boundary surface during the injection molding process. The connection between the yoke plate and the actuator housing is established via the core which is pressed into the yoke plate. Establishing the flanged connection via the yoke plate has the advantage that the plastic body of the actuator does need not be screw-fitted so that a leak due to creep processes of the plastic material is to a large extent avoided.

Such a valve which serves as an electromagnetically operable secondary air valve is described, for example, in DE 10 2008 050 252 A1. This valve controls, via a globe valve, whose valve rod is connected with the armature of the electromagnet, an amount of air to be supplied to the exhaust gas pipe and pumped by a secondary air pump by adjusting, via operation of the electromagnet, a flow cross-section between a fluid inlet duct and a fluid outlet duct connected with the exhaust gas pipe. The valve comprises a non-return flap to prevent the air from flowing back when exhaust gas pulsations occur which is pressed against the valve seat when the valve is closed. In this valve, an O-ring acting as a sealing is pressed in between the yoke plate and the flow housing, which O-ring prevents liquid from entering between these component parts and possibly reaching and damaging the coil.

It has turned out, however, that a gap also exists between the yoke plate and the injection-molded actuator housing, which gap is large enough to allow spray water to enter the actuator from outside and to above all damage the electric component parts of the electromagnet.

SUMMARY

An aspect of the present invention is to provide an actuator where spray water or splash water, which may be contaminated by dissolved salt, can be reliably prevented from entering the electric component parts of the actuator. A further aspect of the present invention is that the sealing is age-resistant and weather-resistant so as to increase the service life of the actuator.

In an embodiment, the present invention provides an actuator for a valve in an internal combustion engine which includes an actuator housing, an electromagnet arranged in the actuator housing, the electromagnet comprising a yoke plate arranged at an axial end of the actuator housing, at least one clamping plate, and a sealing ring arranged at an axial side of the yoke plate facing the electromagnet. The sealing ring is pressed axially towards the yoke plate via the at least one clamping plate.

BRIEF DESCRIPTION OF THE DRAWINGS

The present invention is described in greater detail below on the basis of embodiments and of the drawings in which.

DETAILED DESCRIPTION

Figure 1:
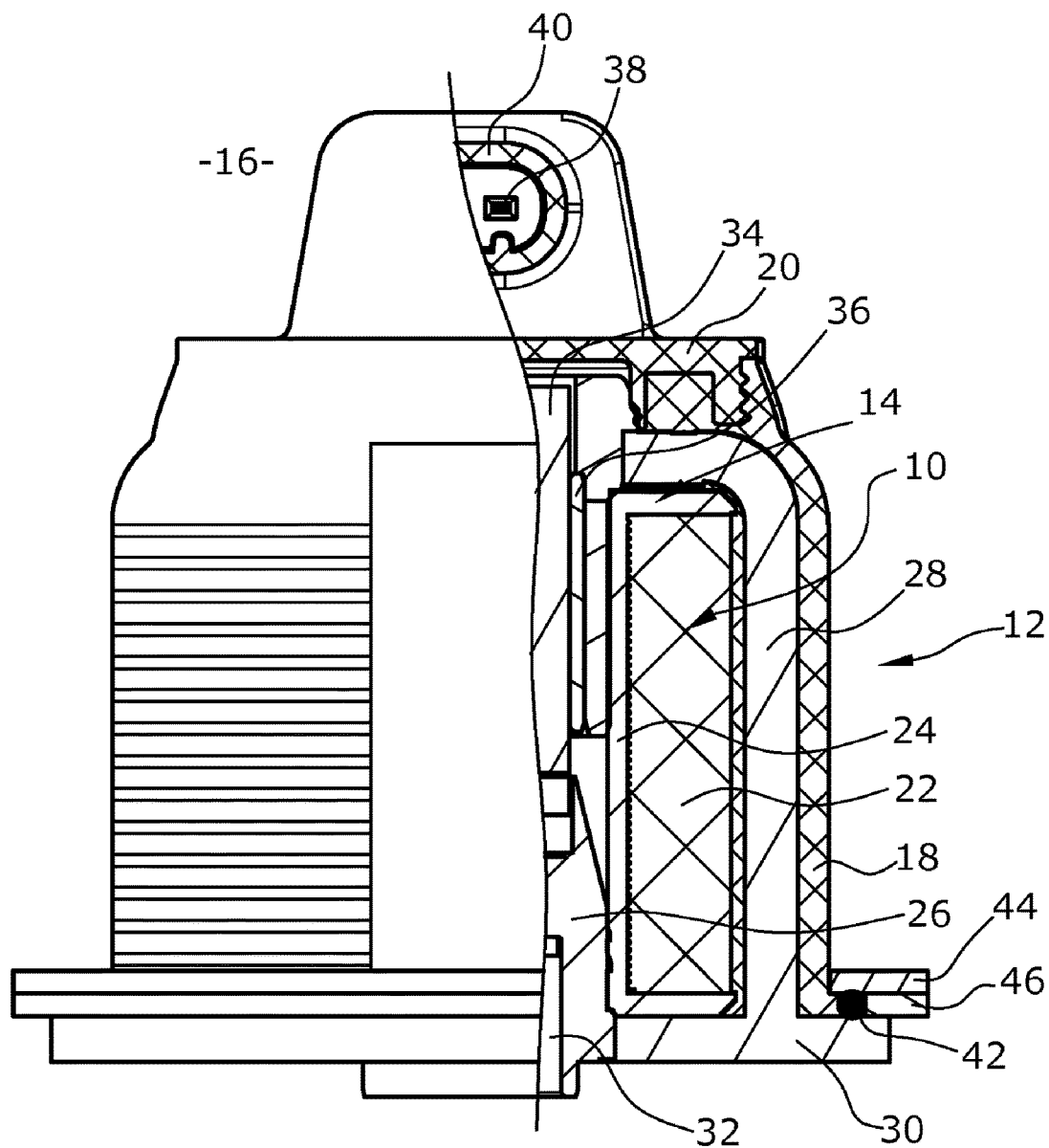
FIG. 1 shows a partially cross-sectional side view of an actuator according to the present invention.
Figure 2:
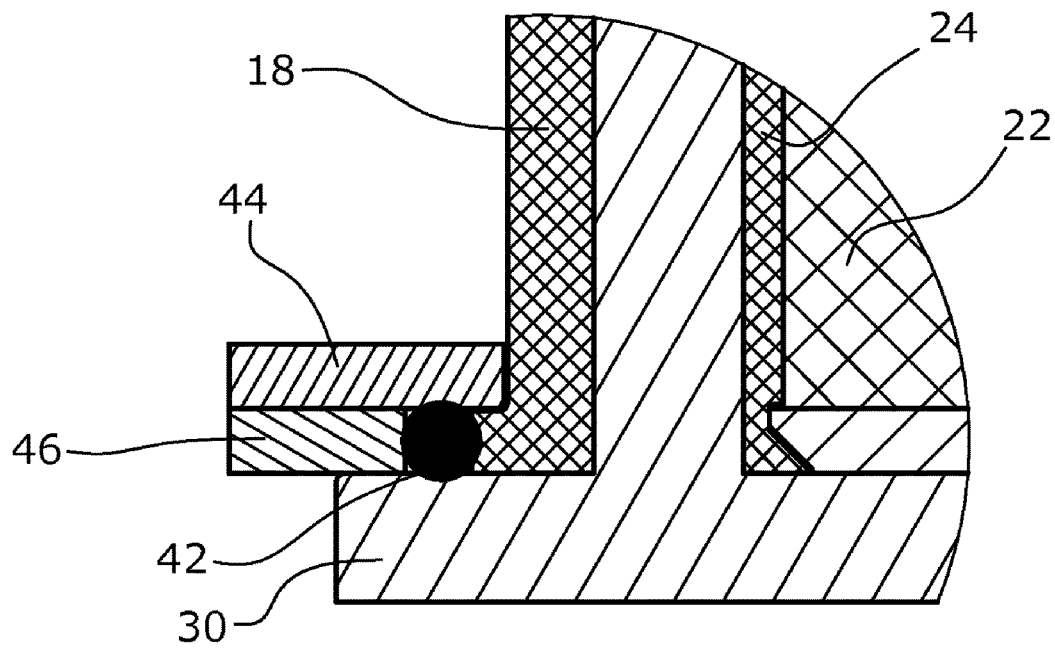
FIG. 2 shows an enlarged detail of the actuator of FIG. 1.

Due to the fact that a sealing ring is arranged at the axial side of the yoke plate facing the electromagnet which is axially pressed towards the yoke plate via a clamping plate, a gap between the actuator housing and the yoke plate is reliably sealed so that liquids are prevented from entering.

In an embodiment of the present invention, the sealing ring can, for example, rest radially inwardly upon the actuator housing. This arrangement prevents water from entering the gap between the actuator housing and the yoke plate via the axial gap between the clamping plate and the actuator housing, whereby the tightness is further increased.

In an embodiment of the present invention, the clamping plate can, for example, comprise radially inwardly a chamfer facing the yoke plate in which the sealing ring is arranged. When the clamping plate is tightened, the sealing ring is thus pressed in in an axial and in a radial direction, which, in turn, results in an improved sealing effect.

In an embodiment of the present invention, a first clamping plate can, for example, axially press the sealing ring against the yoke plate, and a second clamping plate can, for example, radially delimit the sealing ring, wherein the second clamping plate is arranged between the first clamping plate and the yoke plate. This embodiment is particularly inexpensive to manufacture since unworked standard sheet-metal rings can be used as the clamping plates. A radial delimitation by the clamping plate during the axial pressing-in results in the sealing ring deforming towards the inner housing thus also acting as a radial sealing.

In an embodiment of the present invention, the inner circumference of the second clamping plate can, for example, correspond to the outer circumference of the sealing ring in the state as installed and not axially pressed in so that the first clamping ring determines the radial position of the sealing ring and delimits its deformation to the radial outside.

In an embodiment of the present invention, the sealing ring can, for example, be elastic and comprise, in the non-deformed and non-installed state, an inner circumference which is slightly smaller than the outer circumference of the actuator housing in the area adjacent to the yoke plate. This means that the sealing ring must be slightly radially stretched during installation, but in its end position radially bears upon the actuator housing due to its elasticity, whereby a small first radial sealing effect is attained.

In an embodiment of the present invention, through-going bores can, for example, be defined at the clamping plates and the yoke plate in which bores screws are arranged via which the actuator housing is fastened to a flow housing. The screws can generate the force for pressing in the sealing ring to attain the sealing effect in a simple manner and at the same time establish a detachable connection between the housings.

In an embodiment of the present invention, the inner circumference of the one clamping plate or the first clamping plate can, for example, essentially correspond to the outer circumference of the actuator housing. Support on the sealing ring is thus provided and radial displacement of the clamping plate is avoided. The gap between the housing and the clamping plates is also minimized.

A particularly durable connection and sealing is attained due to the fact that the clamping plates are made of metal. Leaks due to creeping of a plastic material caused by aging or increased thermal stresses is avoided. The metallic plates have a high dimensional stability.

An actuator for valves in internal combustion engines is thus provided with the aid of which a considerable increase of the service life of electromagnetic valves is attained since corrosion of the electric component parts in the valve caused by water, which may contain dissolved salt, entering from outside is reliably prevented. A sealing system is provided for this purpose which is particularly simple and inexpensive to install.

Two exemplary embodiments of the actuators according to the present invention are illustrated in the drawings and are described below.

The actuator shown in FIG. 1 comprises an electromagnet 10 which is surrounded by an actuator housing 12 that separates an interior 14, in which the electromagnet 10 is arranged, from an exterior 16. The actuator housing 12 comprises a housing portion 18 essentially radially surrounding the electromagnet 10 as well as a cover portion 20 via which the actuator housing 12 is closed at a first axial end.

The electromagnet 10 is composed of a coil 22 wound around a coil carrier 24, a core 26 fastened in the coil carrier 24, a yoke 28, as well as a yoke plate 30 arranged at the end of the actuator housing 12 opposite to the first axial end, which yoke plate 30 partially closes the axial end and, in the present exemplary embodiment, is integrally formed with the remaining yoke 28. A bipartite configuration is also possible.

The central opening of the yoke plate 30 is pressed onto an axial end portion of the core 26 and is of an essentially plate-shaped configuration. The core 26 comprises a central through-going opening 32 through which extends a valve rod (not shown) of a valve unit to be operated, which valve rod is connected with a movable armature 34 that, when the coil 22 is energized, is pulled towards the core 26 and is loaded via a spring (not shown) in the opposite direction. The armature 34 is supported in a sliding bushing 36 fastened in the interior of the coil carrier 24.

Lead frames 38 are inserted or injection-molded in the actuator housing 12 to supply the coil 22 with current and also to contact any integrated circuit boards, position and pressure sensors, which lead frames 38 lead to a plug 40 that is defined at the cover portion 20.

The cover portion 20 is first injection-molded during manufacture of the actuator housing 12 of the actuator 10. The housing portion 18 radially surrounding the electromagnet 10 is then injection-molded to the cover portion 20 which axially rests upon the metallic yoke plate 30 at its axially opposite side.

If the actuator is used to actuate a valve in a vehicle, it is usually subjected to spray or splash water. Since the plastic material of the actuator housing 12 merely rests upon the yoke plate 30, but is not directly fixedly and sealingly connected therewith, a gap is formed between the housing portion 18 and the yoke plate 30, in particular in the case of a higher thermal stress of the actuator, through which gap spray water, which may be contaminated by dissolved salt, may enter the interior of the electromagnet 10 and may lead to corrosion. It should here be appreciated that the yoke 28 does not completely radially surround the coil 22 so that water may reach the coil 22 and enter the interior 14. Fastening the housing portion 18 to the yoke plate 30 via screws has proved to be inadequately tight due to the creep behavior of the plastic material.

For this reason, according to the present invention, a sealing ring 42 is axially placed upon the yoke plate 30, which sealing ring 42 radially rests upon the housing portion 18. The sealing ring 42 is made of an elastic material and comprises, in its non-installed state, a circumference which is slightly smaller than the circumference of the housing portion 18 in the area resting upon the yoke plate 30. This results in the sealing ring 42 in its installed state radially fixedly resting upon the housing portion 18 and fulfilling a radial sealing function. To reliably seal the radially extending gap between the sealing ring 42 and the yoke plate 30, the sealing ring 42 is axially pressed against the yoke plate 30 via a first clamping plate 44 made of metal. Radial fixing of the sealing ring 42 is effected by a second clamping plate 46 which is axially arranged between the first clamping plate 44 and the yoke plate 30, the inner circumference of the second clamping plate 46 essentially corresponding to the outer circumference of the sealing ring 42. The thickness of the second clamping ring 46 is smaller than the thickness of the sealing ring 42 in its non-compressed state.

The two clamping plates 44, 46 and the yoke plate 30 comprise flange eyes (not shown) through whose openings screws (not shown) are inserted which are fastened to a flow housing of the respective valve to be operated upon which the yoke plate 30 rests. Due to the tightening force of these screws, the clamping force of the clamping plates 44, 46 is generated and thus the sealing ring 42 is pressed in. The sealing effect of the sealing ring 42 along the axial gap between the housing portion 18 and the sealing ring 42 is considerably increased when the screws are tightened since a radially outward expansion of the sealing ring 42 is not possible due to the second clamping ring 46 so that the sealing ring 42 radially rests face to face upon the housing portion 18 and seals the gap formed there as well as the radial gap between the yoke plate 30 and the sealing ring 42. Water cannot thus penetrate between the housing portion 18 and the yoke plate 30 and enter the interior of the actuator.

Figure 3:
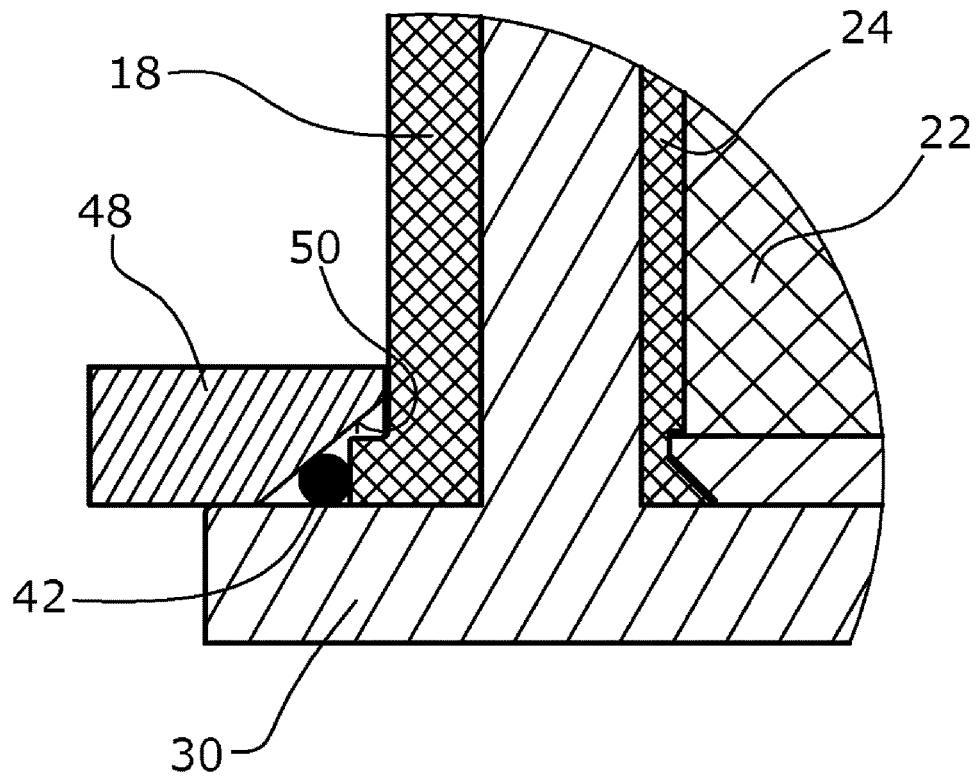
FIG. 3 shows a cross-sectional detail of an actuator according to the present invention as an alternative to FIG. 2.

An alternative sealing is shown in FIG. 3. In this embodiment, instead of the two clamping plates 44, 46, only one clamping plate 48 is used which comprises a chamfer 50 facing the yoke plate 30 at its radially inner circumference. The sealing ring 42 is arranged in the cavity defined by the chamfer 50. When the screws are tightened, sealing ring 42 is pressed by the inclined wall of the chamfer 50 both axially towards the yoke plate 30 and radially inwardly towards the housing portion 18 so as to equally seal the two gaps.

An actuator is thus provided where splash or spray water is reliably prevented from entering the interior of the actuator. Corrosion of the electric and magnetic component parts of the lines and the coil of the electromagnet is accordingly prevented, whereby the service life of the actuator is increased. These sealing functions are attained without involving any major installation or manufacturing costs. Aging of this sealing is avoided by the use of the metallic clamping plates since the sealing effect is not affected by the creep behavior of a plastic material.

It should be appreciated that this type of sealing is suitable for nearly all electromagnetic actuators. The scope of protection of the present application is not limited to the illustrated exemplary embodiments. Design adaptations of the housing or the setup of the electromagnet are apparent to one skilled in the art and can be carried out without departing from the scope of protection of the main claim. Reference should be had to the appended claims.

What is claimed is:

1. An actuator for a valve in an internal combustion engine, the actuator comprising:
   an actuator housing;
   an electromagnet arranged in the actuator housing, the electromagnet comprising a yoke plate arranged at an axial end of the actuator housing;
   at least one clamping plate; and
   a sealing ring arranged at an axial side of the yoke plate facing the electromagnet, the sealing ring being pressed axially towards the yoke plate via the at least one clamping plate.

2. The actuator as recited in claim 1, wherein the sealing ring is arranged to abut radially inwardly on the actuator housing.

3. The actuator as recited in claim 1, wherein the at least one clamping plate comprises a chamfer which is arranged to face the yoke plate radially inwardly, the sealing ring being arranged in the chamfer.

4. The actuator as recited in claim 1, wherein,
   the actuator housing comprises an outer circumference,
   the sealing ring is elastic and comprises an inner circumference in a non-deformed state and in a non-installed state which is smaller than the outer circumference of the actuator housing in an area adjacent to the yoke plate.

5. The actuator as recited in claim 1, wherein,
   the yoke plate comprises through-going bores arranged at the at least one clamping plate, and
   further comprising screws arranged in the through-going bores to fasten the actuator housing to a flow housing.

6. The actuator as recited in claim 1, wherein,
   the at least one clamping plate comprises an inner circumference,
   the actuator housing comprises an outer circumference, and
   the inner circumference of the at least one clamping plate corresponds to the outer circumference of the actuator housing.

7. The actuator as recited in claim 1, wherein the at least one clamping plate is made of metal.

8. The actuator as recited in claim 1, wherein the at least one clamping plate comprises a first clamping plate arranged to axially press the sealing ring against the yoke plate and a second clamping plate arranged to radially delimit the sealing ring, the second clamping plate being arranged between the first clamping plate and the yoke plate.

9. The actuator as recited in claim 8, wherein,
   the yoke plate comprises through-going bores arranged at the first clamping plate and at the second clamping plate, and
   further comprising screws arranged in the through-going bores to fasten the actuator housing to a flow housing.

10. The actuator as recited in claim 8, wherein the first clamping plate and the second clamping plate are each made of metal.

11. The actuator as recited in claim 8, wherein,
   the first clamping plate comprises an inner circumference,
   the actuator housing comprises an outer circumference, and
   the inner circumference of the first clamping plate corresponds to the outer circumference of the actuator housing.

12. The actuator as recited in claim 8, wherein,
   the second clamping plate comprises an inner circumference,
   the sealing ring comprises an outer circumference, and
   the inner circumference of the second clamping plate corresponds to the outer circumference of the sealing ring in an installed state which is not pressed-in axially.

* * * * *